Sept. 24, 1963 A. BASSETT 3,104,767
TRANSFER MECHANISM
Filed Feb. 23, 1961 2 Sheets-Sheet 1
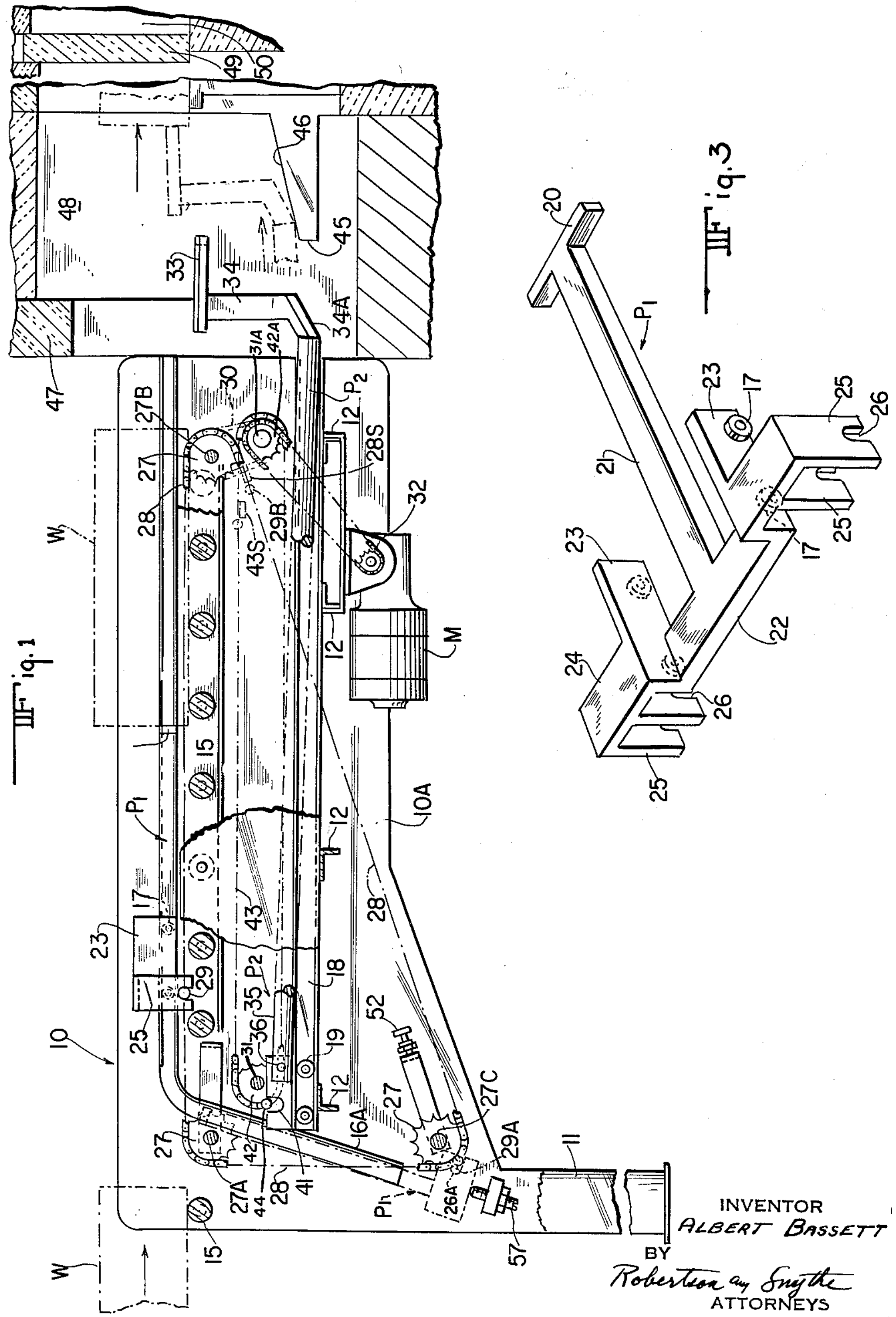
INVENTOR
ALBERT BASSETT
BY
Robertson and Smythe
ATTORNEYS

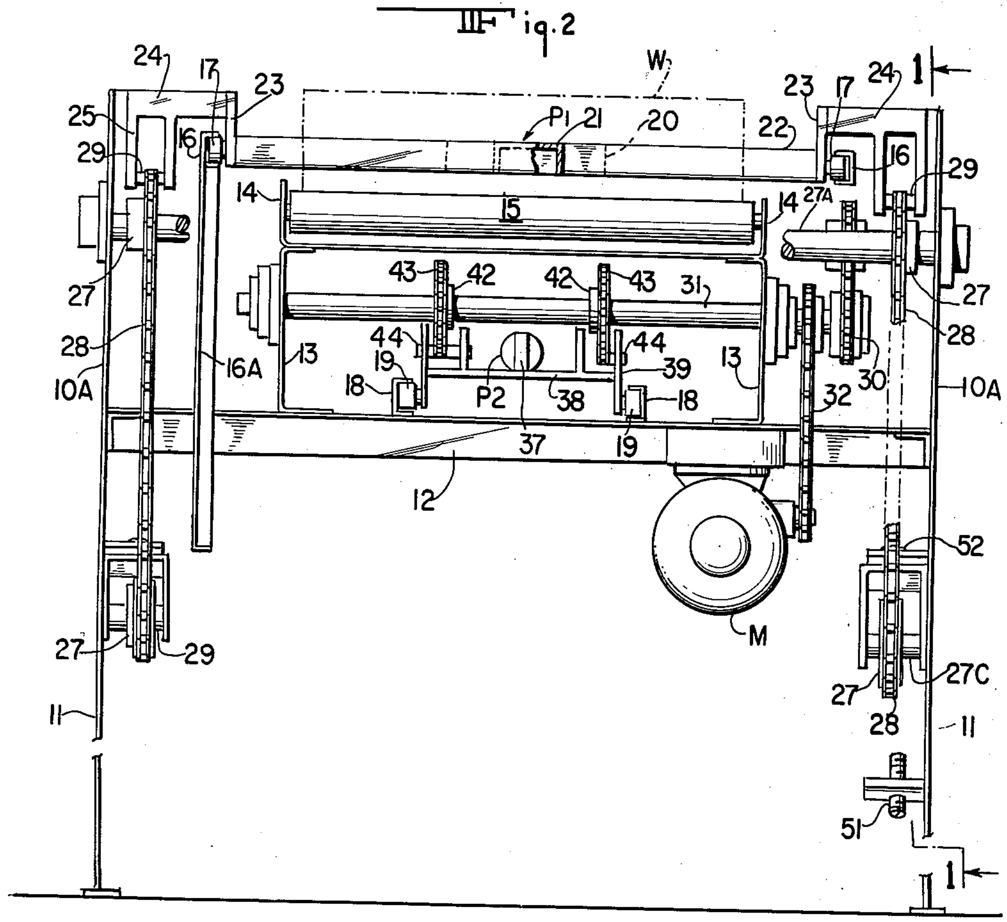
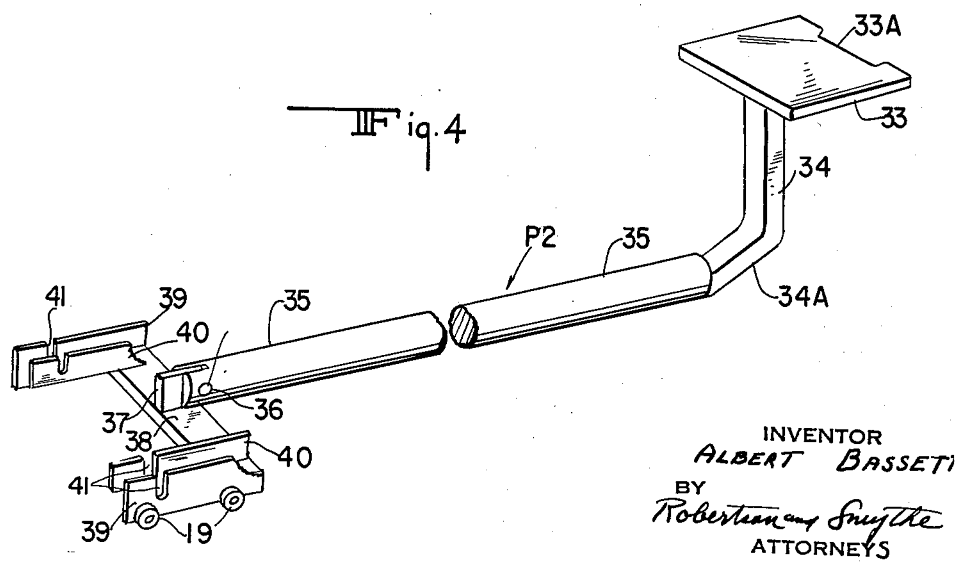
INVENTOR
ALBERT BASSETT
BY
Robertson and Smythe
ATTORNEYS

United States Patent Office 3,104,767
Patented Sept. 24, 1963

3,104,767
TRANSFER MECHANISM

Albert Bassett, Nashotah, Wis., assignor to Basic Products Corporation, Milwaukee, Wis., a corporation of Wisconsin Filed Feb. 23, 1961, Ser. No. 91,161
6 Claims. (Cl. 214—23)

The present invention relates to material handling apparatus by means of which an article may be moved progressively along a path from a loading position to consecutive operating stations. Transfer mechanisms are used in the heat treating art for moving workpieces or work baskets containing miscellaneous workpieces, such as steel parts and the like, from a loading position to subsequent operating positions such as into heat treating or heating chambers. The workpieces in their loading position may be positioned upon a supporting surface leading into or toward such a heat treatment furnace, a pusher element being employed to transfer the workpieces from their loading position into the heat treatment furnace for a heat treating operation. Subsequently, a second pusher element may be employed to transfer these workpieces from the furnace to a second chamber. In prior devices, it has been necessary to have a table long enough to accommodate the length of both pusher elements or to provide a means for temporarily removing the first pusher from the path of articles being loaded to a position in front of the first pusher element. There are some installations where space will not permit such an arrangement.

It will be understood, however, that although the transfer mechanism of the present invention has been designed primarily for such use, other uses therefor are contemplated and, if desired, the apparatus may, with or without modification, be employed in the transportation of all manner of articles along a desired path for any desired purpose.

One of the objects of the invention is to provide an arrangement for shortening the length of the loading surface as compared with prior devices.

Another object of the invention is to provide a simplified form of drive means including a single motor for alternatively reciprocating the pusher elements in order to sequentially advance the work to the operating stations.

In one aspect of the invention, a supporting surface is provided to support the workpiece. A pusher element is employed to advance the workpiece from the supporting surface or table to an operating position. Support means may be provided for said pusher including a pusher retracted surface and a pusher extended surface. The pusher extended surface may be substantially parallel to the work supporting surface and the pusher retracted surface may be angularly disposed to said pusher extended surface so as to be below the path of articles to be loaded onto the work supporting surface. Means are employed for reciprocating the pusher between its retracted and extended positions so as to advance the workpiece from its supporting surface to its operating position.

In another aspect of the invention apparatus, there is provided an arrangement for feeding workpieces from a loading position to two consecutive operating positions. The apparatus may comprise a pusher element adapted to advance the workpiece from the loading position to the first of said operating positions, a second pusher element adapted to advance the workpiece from said first operating position to the second of said operating positions, and drive means adapted to alternatively reciprocate each of said pusher elements whereby said pusher elements will sequentially advance said workpiece to said operating positions, said drive means including means alternatively connecting with said pusher elements to reciprocate one of said pusher elements while the other is disengaged with said drive means.

The foregoing and other objects, features and advantages hereof will become apparent from the following description and drawings, which are merely exemplary.

In the drawings:

FIG. 1 is a sectional elevational view of the transfer mechanism embodying the principles of the invention taken along lines 1—1 of FIG. 2;

FIG. 2 is an end elevational view of the structure shown in FIG. 1;

FIG. 3 is a perspective view of a first pusher element for advancing the workpiece from its loading position to its first operating position, and FIG. 4 is a perspective view of a second pusher element for advancing the workpiece from its first operating position to its second operating position.

A loading table 10 (FIGS. 1, 2) may be provided having a pair of side walls 10A and legs 11 that may be suitably mounted on a floor or base and the like. Loading table 10 may be positioned adjacent heat treating or first chamber 48 having support means 11A and a sliding door 47 which in the form shown moves in a vertical path. A plurality of angle irons or other support members 12 extend between the side walls 10A to rigidly support support brackets 13 which in turn rigidly support brackets 14. A plurality of rollers 15 are journalled in the support brackets 14 and are adapted to support a workpiece W in its loading position prior to being transferred to its first operating position such as in heat treating chamber 48. Rigidly mounted to the table in any suitable fashion are a pair of U-shaped channel members 16 that are adapted to receive and guide a plurality of rollers 17 carried by a first pusher element P1 (FIG. 3). Longitudinal guideways 16 extend substantially parallel to the work supporting surface or rollers 15 and have rearwardly and downwardly extending portions 16A for a purpose later to be described. Rigidly supported on the transverse members 12 are a pair of longitudinally extending U-shaped channel or track members 18 adapted to receive and guide rollers 19 of a second pusher element P2 (FIG. 4).

At the forward end of the first pusher element P1 there is provided a work-engaging member 20. Extending rearwardly therefrom rod or beam member 21 terminates with the cross member 22. Integrally formed with the ends thereof are extensions 23 which adjacent their outer surfaces carry a pair of rollers 17 that are adapted to reciprocate on tracks 16, 16A. Each of the extensions 23 carry outwardly extending members 24 from which depends a pair of members 25 each having in the bottom thereof a downwardly opening notch 26. Each of the four notches (FIG. 3) preferably are in substantially transverse alignment.

Preferably three pairs of sprockets 27 are rotatably mounted on shafts 27A, 27B and 27C (FIG. 1). One of each pair of the sprockets are positioned along their respective shafts so as to align with each other and one of the passages between a pair of members 25 of pusher element P1. Each group of aligned sprockets may carry an endless chain 28. Transversely aligned for simultaneous movement on each chain is a pin member 29 adapted to enter one aligned pair of downwardly opening slots or notches 26 of the pusher element P1.

Rigidly secured to the support members 12 in any desired fashion is a reversible drive motor M which through belt, chain or any other power-transmitting means 32 is adapted to rotate shaft 31A in either direction. A power transmission belt, chain or the like 30 may be employed to inter-connect shafts 31A and 27B.

Each of transversely extending shafts 31, 31A carry a pair of sprockets 42, 42A, respectively. One of each pair of these sprockets is in alignment with each other, as well as with one of the passages between members 39, 40 of second pusher element P2, and carry one of the endless chains 43. Each of the chains 43 carries a pin 44 adapted to enter an aligned pair of upwardly opening slots or notches 41 of the second pusher element P2.

The pusher P2 preferably includes an elongated rod 35 pivotally mounted at 36 to an extension 37 of carriage cross arm 38. Integral with each end of the cross arm 38 are a pair of horizontally spaced members 39, 40, which are provided with upwardly opening and transversely aligned notches or slots 41. The pins 44 are substantially transversely aligned with each other and are adapted to simultaneously enter the corresponding notches 41. The forward end of the rod 35 may extend through a small opening in the front wall of the heat treating furnace 48 out of the main heat or condition therein, the forward end having an upwardly offset work engaging member 33 which may be recessed at 33A. The rod and the offset are connected by vertical extension 34 and inclined or camming member 34A.

The precise speed ratio between shafts 31A and 27B, and the exact location of the pins 44, 29 are predetermined to provide the operation of the transfer mechanism about to be described. The first pusher P1 is shown in its retracted position (dotted lines) in FIG. 1. Its rollers 17 are supported on the inclined tracks 16A such that a workpiece W may be moved forwardly to its loading position without interference by the pusher where it is supported by rollers 15 adjacent the access door 47 of the furnace 48. The motor M is energized to drive the chains 28, 43 in a clockwise direction. The pins 44 will leave notches 41, thereby disengaging the second pusher P2 with its drive means. The pins 29 enter the slots 26 of the retracted first pusher element P1 as shown at 29A and 26A to elevate the pusher up the inclined track 16A. As the pins 29 turn the corner about shaft 27A and sprockets 27 carried thereby, the pusher P1 will be swung clockwise so that its rollers 17 enter tracks 16 with the pusher in horizontal position. As the pusher approaches the work, the sliding access door 47 of the furnace 48 is actuated so that continued movement of the chains will permit the pusher PE to advance the work piece into the chamber 48 for heat treating thereof or the like. When the workpiece W is advanced into the chamber 48, at least one of the pins 29, 44 will contact a stop or limit switch means (one of which is shown in phantom at 43S) to de-energize and eventually reversely operate the motor M. If it be desired to operate the motor manually, a suitable alternative stop means may be employed for abutment by the pin means. Upon reversing the motor, the chains will each move in counterclockwise direction, with pins 29 returning pusher P1 to its retracted position as pins 44 approach the notches 41 on the second pusher P2. After a predetermined time elapse for the workpiece to be treated in its first operating position in chamber 48, which time may be controlled either manually or automatically by a timing switch or the like, the motor M will continue to operate in a reverse direction and the chains in a continued counterclockwise direction, such that pins 44 enter notches 41 to drive the pusher P2 forward. Pins 29 will leave notches 26 in the first pusher P1 to travel toward their switch actuating or stop position, indicated at 29B, for contacting a stop or limit switch means shown in phantom at 28S. As the second pusher P2 moves forward, the inclined member 34A thereof will abut projection or camming surfaces 45, 46 within the furnace to elevate the offset work-engaging member 33 above its normal substantially floor-flush position and behind the workpiece. Continued forward movement of the pusher P2 will, upon elevation or opening of exit door 49, advance the workpiece from the chamber 48 to a second chamber 50 or other operating position. The operation of access and exit doors 47, 49, may be operated or controlled in any desired manner, such as shown in U.S. Patent No. 2,965,369.

When the workpiece reaches its second operating position 50, and the pins 29, reach their limit stop or switch 28S, the motor M will again be reversed to drive the chains again in a clockwise direction, whereby pusher P2 will be retracted from its extended position until pins 44 begin to leave notches 41 and pins 29 approach notches 26 of the retracted pusher P1 pursuant to another cycle of operation.

Adjustable stop means 51 may be mounted on the support legs 11 to adjustably locate the pusher P1 in its retracted position such that pins 29 will properly enter notches 26, particularly when misalignment may occur such as after the tautness or slack in the chains 28 may have been adjusted by an adjusting means 52 interconnecting the sprocket shaft 27C and adjacent side walls 10A.

It is to be understood that the described exemplary embodiment is merely intended for the purpose of illustration, and that the principles of the invention are not intended to be limited thereto, except as defined in the appended claims.

What is claimed is:

1. In an apparatus for feeding workpieces from a loading position to two consecutive operating positions, the combination comprising a pusher element adapted to advance a workpiece from said loading position to the first of said operating positions, a second pusher element adapted to advance said workpiece from said first operating position to the second of said operating positions and drive means adapted to alternatively reciprocate each of said pusher elements whereby said pusher elements will sequentially advance said workpiece to said operating positions, said drive means including separate simultaneously operated power transmitting means each having means alternatively connecting with a corresponding one of said pusher elements to reciprocate one of said pusher elements while the other is disengaged with said drive means.

2. In an apparatus for consecutively feeding workpieces from a loading position to two operating chambers, the combination comprising aligned first and second chambers, a supporting surface leading to said first chamber and adapted to support a workpiece, a pusher element adapted to advance a workpiece from said supporting surface to said first chamber, support means for said pusher including a surface angularly disposed to said work supporting surface and adapted to support said pusher element in a retracted position remote from said work supporting surface, a second pusher element adapted to advance said workpiece from said first chamber to said second chamber, and drive means adapted to alternatively reciprocate each of said pusher elements whereby said pusher elements will sequentially advance said workpiece to said chambers, said drive means including separate simultaneously operated power transmitting means each having means alternatively connecting with a corresponding one of said pusher elements to reciprocate one of said pusher elements while the other is disengaged with said drive means.

3. In an apparatus for feeding workpieces from a loading position to two consecutive operating positions, a combination comprising a pusher element adapted to advance a workpiece from said loading positions to the first of said operating positions, a second pusher element adapted to advance said workpiece from said first operating position to the second of said operating positions, notch means on each of said pusher elements, and drive means adapted to alternatively reciprocate each of said pusher elements whereby said pusher elements will sequentially advance said workpiece to said operating positions, said drive means including separate simultaneously operated power transmitting means each having pin means for alternatively connecting with a corresponding one of said notch means to reciprocate one of said pusher elements while the other is disengaged from said drive means.

4. In an apparatus for feeding workpieces from a loading position to two consecutive operating positions, the combination comprising a pusher element adapted to advance a workpiece from said loading position to the first of said operating positions, a second pusher element adapted to advance said workpiece from said first operating position of the second of said operating positions, notch means on each of said pusher elements, and drive means adapted to alternatively reciprocate each of said pusher elements whereby said pusher elements will sequentially advance said workpiece to said operating positions, said drive means including single motor means for supplying power thereto, separate chain means simultaneously driven by said motor, pin means on each of said chain means for alternatively connecting with a corresponding one of said notch means to reciprocate one of said pusher elements while the other is disengaged from said drive means.

5. In an apparatus for consecutively feeding workpieces from a loading position to two operating chambers, the combination comprising aligned first and second chambers, a supporting surface leading to said first chamber and adapted to support a workpiece, a pusher element adapted to advance a workpiece from said supporting surface to said first chamber, support means for said pusher including a surface angularly disposed to said work supporting surface and adapted to support said pusher element in a retracted position remote from said work supporting surface, a second pusher element adapted to advance said workpiece from said first chamber to said second chamber,. notch means on each of said pusher elements, and drive means adapted to alternatively reciprocate each of said pusher elements whereby said pusher elements will sequentially advance said workpiece to said chambers, said drive means including separate simultaneously operated power transmitting means each having pin means for alternatively connecting with a corresponding one of said notch means to reciprocate one of said pusher elements while the other is disengaged with said drive means.

6. In an apparatus for consecutively feeding workpieces from a loading position to two operating chambers, the combination comprising aligned first and second chambers, a supporting surface leading to said first chamber and adapted to support a workpiece, a pusher element adapted to advance a workpiece from said supporting surface to said first chamber, support means for said pusher including a surface angularly disposed to said work supporting surface and adapted to support said pusher element in a retracted position remote from said work supporting surface, a second pusher element adapted to advance said workpiece from said first chamber to said second chamber, notch means on each of said pusher elements, and drive means adapted to alternatively reciprocate each of said pusher elements whereby said pusher elements will sequentially advance said workpiece to said chambers, said drive means including single motor means for supplying power thereto, separate chain means simultaneously driven by said motor, pin means on each of said chain means for alternatively connecting with a corresponding one of said notch means to reciprocate one of said pusher elements while the other is disengaged with said drive means.

References Cited in the file of this patent

UNITED STATES PATENTS

| | | |
|---|---|---|
| 2,260,528 | Levy et al. | Oct. 28, 1941 |
| 2,896,775 | Ipsen | July 28, 1959 |
| 2,965,369 | Acker et al. | Dec. 20, 1960 |